United States Patent [19]

Hinxlage

[11] 3,858,627
[45] Jan. 7, 1975

[54] BEVERAGE PROCESSING PLANT WITH REDUCED WATER CONSUMPTION
[75] Inventor: Aloys Hinxlage, Dortmund, Germany
[73] Assignee: Holstein & Kappert Maschinenfabrik "Phonix" Gmbh, Dortmund, Germany
[22] Filed: Nov. 20, 1972
[21] Appl. No.: 308,123

[30] Foreign Application Priority Data
May 26, 1972 Germany............................ 2225676

[52] U.S. Cl.................... 141/1, 62/434, 134/105, 134/108, 141/82, 165/66
[51] Int. Cl........................... B65b 3/04, B67c 1/00
[58] Field of Search............................. 62/434–436; 134/105, 107, 108; 137/340; 141/1, 82, 98, 392; 165/66

[56] References Cited
UNITED STATES PATENTS
2,466,769   4/1949   Herold et al.................... 134/105 X
2,526,286   10/1950  Schwarzkopf et al. ......... 134/108 X
2,937,856   5/1960   Thomson............................ 165/66
3,581,649   6/1971   Rauenhorst....................... 165/66 X
3,590,918   7/1971   Rawdon............................. 165/66 X Primary Examiner—Houston S. Bell, Jr.
Assistant Examiner—Frederick R. Schmidt
Attorney, Agent, or Firm—Toren, McGeady and Stanger

[57] ABSTRACT

A plant for cleaning bottles and for filling the bottles with a beverage is arranged to reduce the consumption of water. The plant includes a heat-exchanger with a primary and a secondary circuit. The beverage to be bottled is passed through the secondary circuit for extracting heat from the primary circuit. One part of the primary circuit is connected to a chamber which collects water after it is sprayed on the bottles and another part of the primary circuit is traversed by a liquid used in a vacuum pump associated with the beverage filling operating. After its passage through the heat-exchanger, the water used to spray the bottles is returned to the spraying operation. Controls, including valves, are provided for selectively directing the return flow of water from the heat-exchanger to different parts of the spraying operation.

10 Claims, 1 Drawing Figure

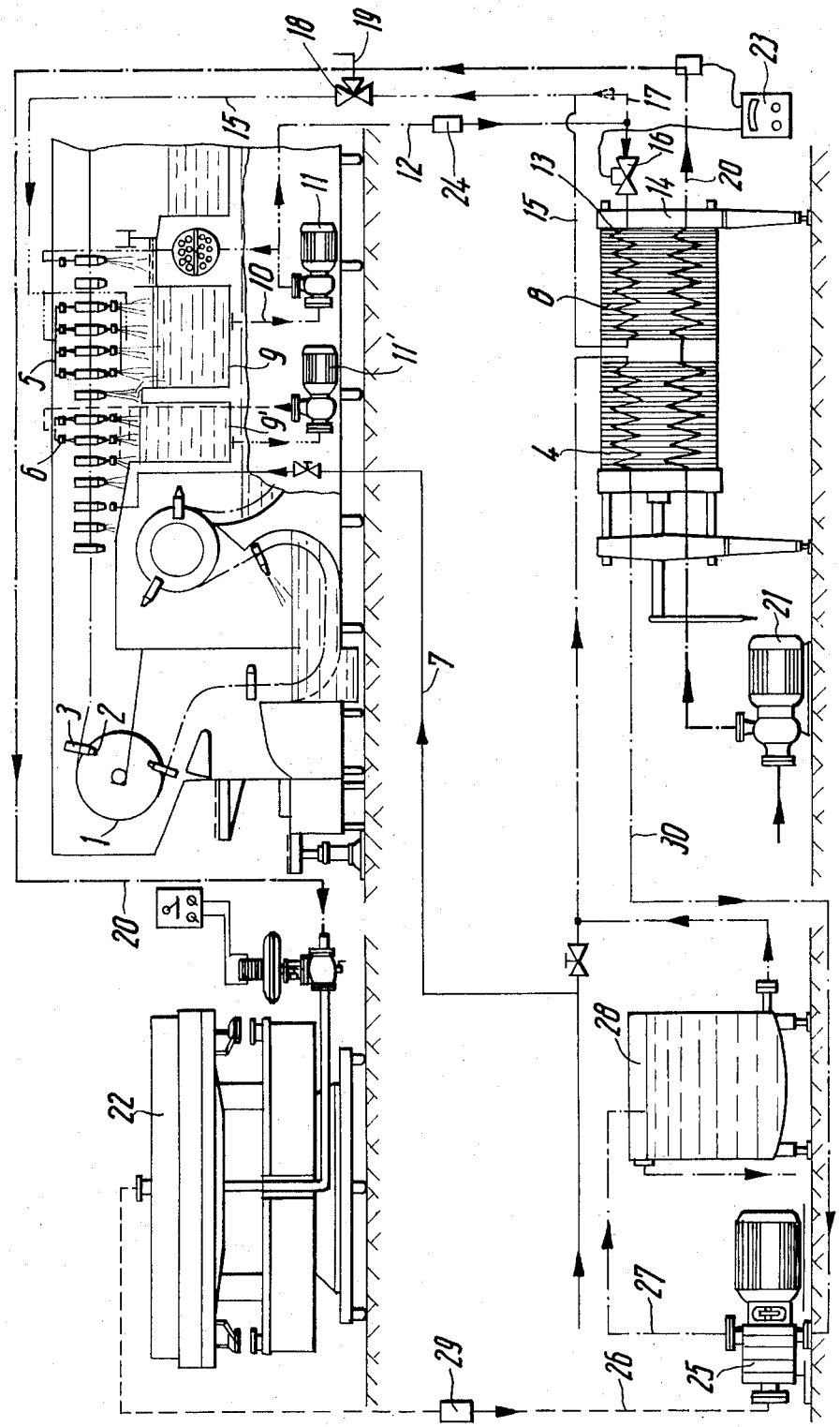

BEVERAGE PROCESSING PLANT WITH REDUCED WATER CONSUMPTION

SUMMARY OF THE INVENTION

The present invention is directed to a beverage processing plant and, more particularly, it concerns a method of and a plant arrangement for reducing the fresh water consumption of the processing plant.

In beverage processing plants the operation of cleaning bottles requires a high consumption of drinking water and to a decisive extent, the processing plant determines the total water consumption of a production site. However, water is among those products which are in increasingly shorter supply and thus of very great importance.

Another significant problem in such processing plants is the disposal of waste water, the costs involved in the disposal of waste water are considerable and have reached a level comparable to the cost of the fresh or drinking water itself.

Accordingly, limiting the consumption of water in a beverage processing plant has become one of its most urgent problems.

Fully automatic bottle cleaning machines were introduced about half a century ago. At that time the water consumption in the machine was about 1 liter per bottle. Gradually the water consumption has been reduced and now has reached a level of about 0.4 liters per bottle. This reduction in the amount of water consumed is considered to be a minimum, since any further reduction would, in particular, affect the heat balance of the cleaning machine. It is necessary to cool the bottles because of the hot washing solution used during the cleaning operation. Any reduction in the fresh water supply would be insufficient to maintain the temperature level in the recooling zones of the cleaning machine and, as a result, there is the risk that the bottles might break due to temperature stresses in the glass, both during cold water spraying (in winter the temperature of the water drops to about 5°C) and in the filling machine during the introduction of the very cold beverage (when beer is filled into the bottles it has a temperature down to the freezing point).

The bottles or other containers to be cleaned are passed through several zones arranged in series each at a given temperature, and, if necessary, each zone has a different concentration of the cleaning solution. The after-cleaning or rinsing is achieved principally with fresh tap water and after flowing over the bottles in the last stage of the cleaning operation it is discharged, as waste water, into the sewerage system after passing through the last stage of the cleaning operation.

The primary object of the present invention is to reduce the fresh water supply used during the cleaning of the bottles and, thus, reduce the amount of waste water below the amount presently used. Another object is to cool the water in a suitable manner and, at the same time, to transfer the heat from the water to the beverage being processed.

In accordance with the present invention, a bottle-cleaning machine is arranged in combination with a heat-exchanger for collecting water used in cooling and spraying the bottles and passing the water through the heat-exchanger for transferring heat to another liquid which is at a lower temperature as it traverses the heat-exchanger.

In another feature of the invention, the fresh water and/or hot water collected after cooling and/or spraying, is fed to the primary circuit of the heat-exchanger while a liquid at a lower temperature traverses the secondary circuit.

When the beverage being bottled, such as beer, is circulated through the secondary circuit of the heat-exchanger it absorbs heat from the fresh water or hot water used in the cooling or spraying process. Accordingly, the amount of heat which prevents the reuse of the water is removed and is used, at the same time, to heat the beverage to be filled into the bottles. Therefore, the temperture gradient, which increases due to the reduced fresh water supply, is compensated in an excellent manner.

In another feature of the invention, to reduce the amount of water consumed in the beverage bottling operation, when a vacuum pump is used the water providing a cooling action for the pump is fed to a part of the primary circuit of the heat-exchanger and passes in heat exchange relationship with the beverage to be bottled which is at a lower temperature.

It has been found to be particularly expedient to heat the liquid to be bottled in two stages, that is in the first stage passing the liquid to be bottled in heat exchange relationship with the heat transfer medium from the vacuum pump and in the second stage passing the liquid to be bottled in heat transfer relationship with the heated water used in the spraying and cooling operation in the bottle-cleaning machine.

Additional savings in fresh water are achieved, in accordance with the present invention, by feeding the amount of water used for cooling and/or spraying intermittently or continuously, then collecting the water used independently of the cleaning solution used, cooling the water and/or returning it to the primary circuit of the heat-exchanger through which the beverage to be bottled flows in the secondary circuits, and returning the cool water to the cooling and/or spraying zones of the bottle-cleaning machine.

The apparatus for carrying out the method of the present invention is characterized by the use of a bottle-cleaning machine having a collecting chamber with a line connecting the chamber to the primary circuit in a heat-exchanger, a multi-way valve located in the line and also connected to a bypass so that the valve can be controlled by a temperature-measuring instrument positioned in the secondary circuit of the heat-exchanger.

In another feature of the plant, a reversing valve is arranged in the bypass connected to the multi-way valve and a branch line leads from the reversing valve to another cooling and/or cleaning zone of the plant. In this manner, fresh water used for several cycles can be fed automatically to another zone of the cleaning machine which operates at a higher temperature.

It has been found to be advantageous if the reversing valve located in the bypass is temperature-controlled or is designed so that it is controlled by impulses from the multi-way valve.

As an alternative arrangement, it is suggested that an outlet pipe, controlled by a reversing valve, extends from the return flowpaths to another treatment zone of the bottle-cleaning machine with the passage being opened as soon as the temperature in the line rises above a predetermined value. To assure that the fresh water used has the same purity as the tap water supplied to the machine, even after several cleaning cycles, a purifying system is arranged in the flowpath of the water either to or from the heat-exchanger.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a schematic showing of a beverage processing plant embodying the present invention.

DETAILED DESCRIPTION OF THE INVENTION

In the drawing, the bottles 2 move along a path of movement 1 through the bottle-cleaning operation. The bottles 2 are secured in receiving cells 3 and are transported through the different zones of the cleaning machine represented in a simplified form. The cleaning zones include a cleaning solution switch in combination with a superheated high-pressure cleaning solution spraying zone, followed, if necessary, by additional spraying stations. Following the last high-pressure spraying zone, which can be arranged as a phosphate sluice or chamber, are arranged an intermediate hot water spraying zone, a hot water spraying zone 5 and a fresh water spraying zone 6. These relatively expensive spraying operations are needed to achieve the required degree of cleanliness of the bottles in respect both to chemical and bacteriological conditions. The intermediate hot water spraying zone serves to rinse away any residue of the cleaning agents which have been introduced into the bottles.

A feed pipe 7 which can be connected, if necessary, to the hot water spraying zone 5, leads to the fresh water spraying zone 6. The feed pipe 7 is connected to a source of fresh water, not shown. Below the fresh water spraying zone 6 and also below the hot water spraying zone 5 are arranged collecting chambers 9', 9 respectively and a line 10 extends from the collecting chamber 9 to a pressure booster pump 11 from which a line 12 extends to the primary circuit 13 of a heat-exchanger 14. The fresh water can overflow, as shown in the drawing, from collecting chamber 9' to collecting chamber 9. The pump 11' located below and connected to the collecting chamber 9' and the fresh water spraying zone affords recirculation of the fresh water. Preferably, the heat-exchanger is designed as a plate-type heat-exchanger with two different heat exchange stages 4, 8. Though not shown, a cooling device can be used in place of the heat-exchanger 14 for assuring that the fresh water is cooled to the required return flow temperature, if the filling operation is interrupted.

The water cooled in the heat-exchanger exits through a conduit 15 and returns to the zones 5, 6. In the line 12 leading to the heat-exchanger is a valve 16 and a by-pass 17 is connected at one end to the valve and at its other end into the conduit 15. Within the line 15 downstream of the bypass 17 is a reversing valve 18 with a branch connection to another cleaning zone, not shown. On its secondary side, that is the secondary circuit, the heat-exchanger is traversed by the beverage to be filled into the bottles. The beverage is fed into the heat-exchanger through a line 20 from a pressure booster pump 21 the line originates at a source, not shown, of the beverage to be filled in the bottles. From the heat-exchanger, the line 20 is connected to the filling chamber of a filling or bottling machine 22 for charging the beverage into the bottles washed in the cleaning machine.

From the spraying zones 5, 6 the fresh water and/or hot water, which is at an elevated temperature, is collected in the chamber 9 and flows through the lines 10 and 12 to the valve 16 and then into the primary circuit 13 of the heat-exchanger where it is cooled in heat transfer relationship with the beverage flowing through the secondary circuit which is heated. The cooled water can be returned to the spraying zones 5, 6 for reuse. When the beverage passing through the line 20 which acts as the secondary circuit of the heat exchanger, exceeds a predetermined temperature, the supply of water into the primary circuit of the heat-exchanger is discontinued by means of the temperature-measuring instrument 23 located in the flowpath of the beverage-carrying line 20 after it leaves the heat-exchanger. Under these circumstances, the water from the line 12 is directed through bypass 17 into the conduit 15 for return to the spraying zones or it may be diverted through the reversing valve 18 to the line 19 for flow into another spraying zone, not shown. The reversing valve 18 can be arranged so that it is controlled by impulses of the valve 16 positioned in the line 12. Arranged in the line 12 between the pump 11 and the valve 16 is a water purifying system 24 for assuring that the water circulated is as pure as the tap water supplied to the plant even after it has it has gone through several cleaning cycles. The water purifying system 24 can also be arranged in the bypass 17 and in certain other portions of the circulating system.

The branch connection 19, as mentioned above, is connected to a treatment zone of the cleaning machine, not shown. When the temperature of the water flowing in the bypass reaches a predetermined value, the reversing valve 18 is adjusted and the water flows through the branch connection 19. After the temperature of the water in the bypass 17 has dropped or the temperature of the beverage flowing through the line 20 has dropped, both as determined by the temperature-measuring instrument 23 the flow through the bypass line 17 is discontinued and the valve 16 opens in response to the temperature-measuring instrument to permit flow through the primary circuit 13 of the heat-exchanger 14. The water is returned to the spraying zones to afford further reduction in its consumption. Furthermore, the heat-exchanger can be divided into two or more stages. If the heat-exchanger has multiple stages, it is possible to subdivide the collecting chamber 9 for directing the flow of water from the subdivided chambers through different stages of the heat-exchanger. In addition, the cooling of the fresh water used in the cleaning operation can be carried out separately from the cooling of the hot spray water and the hot spray water can be fed to an intermediate hot water spraying zone after initially passing through a spraying zone of higher temperature. In the arrangement of the heat-exchanger shown in the drawing, its stage 4 is traversed by the heated water from a vacuum pump 25. The vacuum pump 25 is connected to a suction line 26 of the machine 22 for filling the beverage into the bottles. A liquid separator 29 can be positioned, if necessary, in the suction line 26. A conduit 27 extends from the vacuum pump 25 to a tank 28 and then from the tank to the first stage 4 of the heat-exchanger 14 where the water from the vacuum pump 25 passes in heat transfer relationship with the beverage flowing through the line 20 in the secondary circuit of the heat-exchanger. After being cooled in the heat-exchanger, the water returns through a line 30 back to the vacuum pump 25. Further, the line 27 is connected to the line 7 for supplying fresh water into the bottle-cleaning operation. If sealing water is lost in the vacuum pump 25 it can be replenished through the connection of line 27 to line 7.

While the present method has been described with regard to a beverage bottling operation, it can be appreciated that the invention is applicable to other container processing plants, for example, in a pastuerizing tunnel.

While a specific embodiment of the invention has been shown and described in detail to illustrate the application of the inventive principles, it will be understood that the invention may be embodied otherwise without departing from such principles.

What is claimed is:

1. Method of preparing bottles in a bottling operation prior to filling the bottles with a liquid, including the steps of passing the bottles, in turn, through a cleaning solution zone and spraying the bottles with a high-pressure cleaning solution, through a hot water spraying zone and spraying the bottles with hot water and then through a fresh water spraying zone and spraying the bottles with fresh water, wherein the improvment comprises the steps of collecting the water sprayed on the bottles in the hot water spraying zone and the fresh water spraying zone, passing at least the water collected from the hot water spraying zone in indirect heat exchange relationship with the liquid to be filled into the bottles which liquid is at a lower temperature than the collected water so that the collected water is cooled and the liquid to be bottled is heated, and returning the cooled water for at least reuse in the hot water spraying step.

2. Method of preparing bottles in a bottling operation prior to filling the bottle with a liquid for reducing the amount of water used in a processing machine in which the bottles are cleaned and in particular reducing the consumption of fresh water in the bottle-cleaning operation preceding the bottling operation, including arranging several cleaning zones followed by a plurality of cooling zones in which the operating temperatures are different and through which the bottles are passed in completing the cleaning operation, wherein the improvment comprises collecting the fresh water used in the cooling zones, passing at least a portion of the collected fresh water in heat exchange relationship with the liquid to be bottled which is at a lower temperature than the collected fresh water so that the fresh water is cooled and the liquid is heated in completing the heat exchange relationship, and returning the cooled water after it passes in heat exchange relationship for reuse in the cooling zones.

3. Method for reducing the amount of water used in a liquid beverage processing machine in which bottles are cleaned and then filled with the liquid beverage, and, in particular, for reducing the consumption of fresh water in the bottle-cleaning operations preceding the bottling operations which include several cleaning and cooling zones operating at different temperatures, the bottle-cleaning operation includes the steps of spraying fresh water on the bottles after the passage of the bottles through the cleaning operation, subsequently filling the cleaned bottles with the liquid beverage, and providing vacuum conditions for the bottle-filling operations including circulating a cooling liquid for use in maintaining the vacuum conditions, wherein the improvement comprises collecting the fresh water after it has been sprayed over the bottles, passing the collected fresh water in heat exchange relationship with the liquid beverage which is at a lower temperature than the collected fresh water so that the collected fresh water is cooled and the liquid beverage is heated, returning the cooled water to the cooling zones, passing the cooling liquid used in the maintenance of vacuum conditions in heat exchange relationship with the liquid beverage which is at a lower temperature than the cooling liquid, and returning the cooling liquid after it has been circulated in heat exchange relationship for use in the maintenance of the vacuum condition.

4. Method, as set forth in claim 3, wherein flowing the liquid beverage, to be filled into the bottle, serially through at least two heat exchange stages wherein in a first stage flowing the cooling liquid used in the maintenance of vacuum conditions in indirect heat relationship with the liquid beverage for heating the liquid beverage and cooling the cooling liquid and then directing the liquid beverage through the second stage and flowing the collected fresh water through the second stage in indirect heat exchange relationship with the liquid beverage for further heating the liquid beverage and cooling the collected fresh water, and returning the cooling liquid from the outlet for the first stage for use in maintaining the vacuum conditions and returning the collected fresh water from the outlet for the second stage for further use in the spraying operations in the cooling zones.

5. Plant for cleaning bottles and for filling the bottles with a liquid beverage comprising a machine for cleaning the bottles with a cleaning solution, means for spraying fresh water on the bottles after passage through the cleaning solution, wherein the improvement comprises means forming a chamber for collecting the fresh water after it is sprayed on the bottles, a heat-exchanger having a primary circuit and a secondary circuit so that fluids can be passed through each of the circuits in indirect heat transfer relationship, a first line connecting said collecting chamber to the primary circuit of said heat-exchanger and connecting the primary circuit to the means for spraying fresh water, a second line connected to the secondary circuit of said heat-exhcanger for flowing the liquid beverage from a source of liquid beverage through the secondary circuit prior to filling it into the bottles and to a filling machine for filling the bottles, a valve positioned in said first line adjacent said primary circuit, a bypass connected to said valve and to said means for spraying fresh water, and means connected to said second line downstream of said secondary circuit for measuring the temperature of the liquid beverage in the secondary circuit of said heat-exchanger, said measuring means being connected to said valve for controlling the setting of said valve for directing the flow of the collected fresh water to the primary circuit of said heat-exchanger or to said bypass in dependence on the temperature of the liquid beverage within the secondary circuit.

6. Plant for cleaning bottles and for filling the bottles, as set forth in claim 5, wherein a reversing valve is located in said bypass downstream from said valve in said first line, a branch line leading from said reversing valve, and said branch line arranged to direct the collected fresh water to another part of the bottle-cleaning machine when said reversing valve cuts off flow to said means for spraying fresh water.

7. A plant for cleaning bottles and for filling the bottles, as set forth in claim 6, wherein said reversing valve is connected to said valve positioned in said first line and is controlled by impulses from said valve positioned in said first line in response to the said means for measuring the temperature in the secondary circuit for selectively directing the flow through the reversing valve to continue in said bypass to said means for spraying fresh water or to flow into said branch line.

8. A plant for cleaning bottles and for filling the bottles, as set forth in claim 6, wherein an outlet line is connected to a outlet from the primary circuit in said heat-exchanger and to said bypass for supplying the fresh water circulated through the primary circuit to said means for spraying fresh water, and said reversing valve being located in said bypass downnstream from the connection of said outlet line to said bypass.

9. Plant for cleaning bottles and for filling the bottles with a beverage, as set forth in claim 8, wherein a water-purifying device is positioned in the by-pass in the flowpath of water flowing between said spray means and said heat-exchanger.

10. Plant for cleaning bottles and for filling the bottles, as set forth in claim 5, wherein the primary circuit in said heat-exchanger is divided into separate first and second sections, a vacuum pump connected to said filling machine arranged for use in filling the liquid beverage into the bottles, said first line from said collecting chamber being connected to the first section of the primary circuit in said heat-exchanger, a third line connected to said vacuum pump and to the second section of said primary circuit in said heat-exchanger and from the second section of the heat-exchanger back to the vacuum pump for passing cooling water used in maintaining vacuum conditions in said vacuum pump into the second section so that the liquid beverage flowing through the secondary circuit in said heat-exchanger passes in heat transfer relationship with the collected fresh water and the cooling water used in said vacuum pump.

* * * * *